(No Model.)
H. A. BALLARD.
SPEED GOVERNOR.
No. 456,392. Patented July 21, 1891.
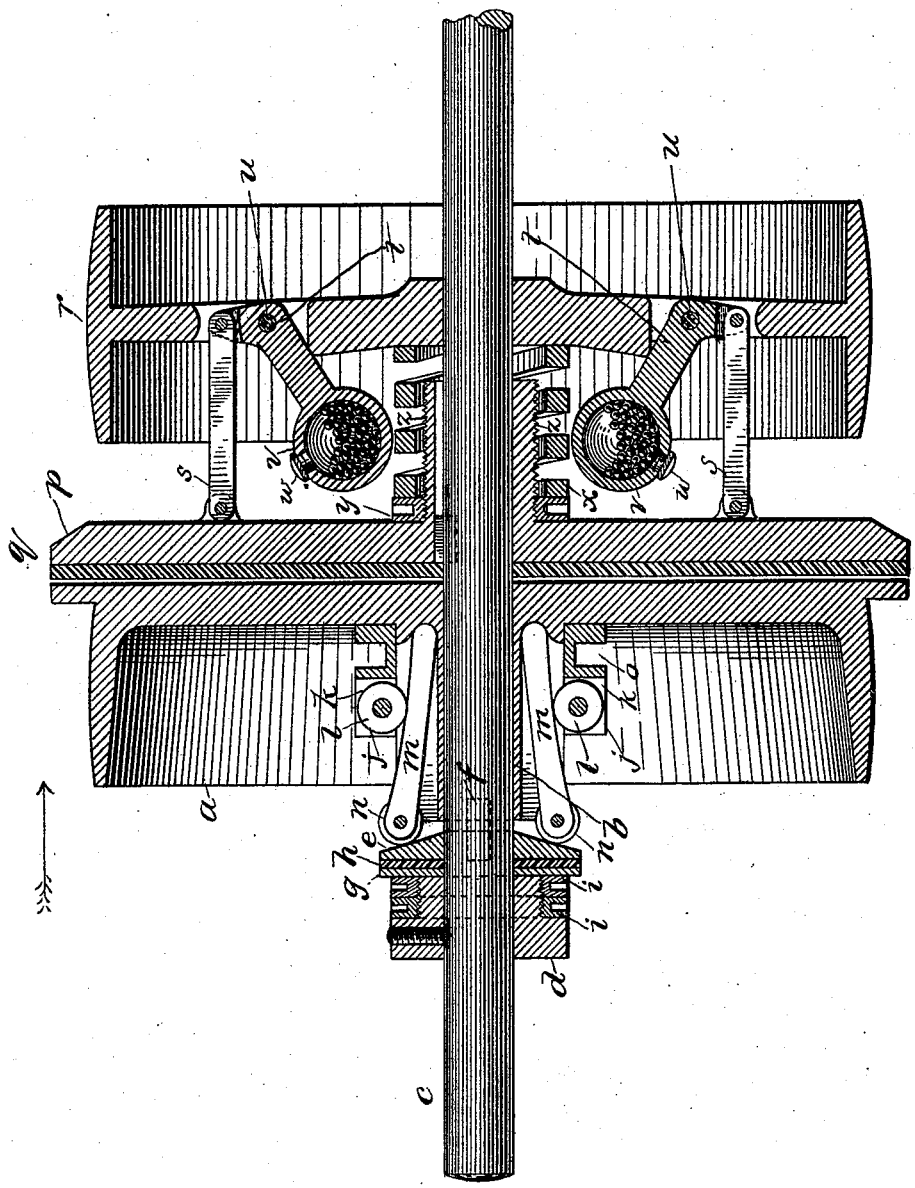

UNITED STATES PATENT OFFICE.

HARRIE A. BALLARD, OF EAST BOSTON, MASSACHUSETTS.

SPEED-GOVERNOR.

SPECIFICATION forming part of Letters Patent No. 456,392, dated July 21, 1891.

Application filed November 7, 1890. Serial No. 370,611. (No model.)

*To all whom it may concern:*

Be it known that I, HARRIE A. BALLARD, of East Boston, in the county of Suffolk and State of Massachusetts, have invented certain new and useful Improvements in Speed-Governors, of which the following is a specification.

My invention has relation to devices which are contrived to limit or govern the speed at which machines may be driven from a prime motor operated at a comparatively high rate of speed, so that the speed at which the said machines are run may be regular and uniform.

It is the object of my invention to provide such improvements in speed-governors as will simplify their construction, enhance their efficiency and certainty of operation, render them readily adjustable to varying circumstances, and adapt the device to serve also as a starting and stopping clutch.

My improvements will first be described in view of the annexed drawing and letters of reference marked thereon, forming a part of this specification, and then be pointed out in the claims.

The said drawing represents a longitudinal sectional view of a clutch mechanism and speed-governing device embodying my improvements.

$a$ designates the driver, which is herein shown as a pulley provided with a hub $b$, arranged to normally run loose on the shaft $c$.

$d$ is a collar, which may be keyed or otherwise fixed upon shaft $c$ to turn therewith, and $e$ is a cam or cone disk contrived to normally run loosely on the shaft $c$, and it may be connected with the hub of the driver $a$ so as to turn in unison therewith. A means for accomplishing this latter end is shown in the pins $f$, (represented only by dotted lines,) which are connected with the disk $e$ and extend into holes formed in the hub $b$.

$g$ designates a washer of any suitable material arranged on the shaft $c$ adjacent to the inner face of the collar $d$, and $h$ designates a washer of rawhide or other suitable material arranged on the driving-shaft intermediate of the disk $f$ and washer $g$.

$i\ i$ designate adjusting-nuts having a screw-threaded connection with the inner end of the collar $d$ and bearing against the washer $g$.

Upon the hub $b$ of the driver $a$ is a collar $j$, splined or otherwise connected with the said hub, so as to turn therewith, but at the same time be longitudinally movable thereon. Suitably journaled in slots or grooves $k$ of the said collar $j$ are bowls or rollers $l$, which are arranged to bear upon levers $m$, set in grooves formed in the hub $b$ and bearing at their inner ends in sockets formed at the base of the grooves in the hub. At their outer ends the levers $m$ are provided with bowls or rollers $n$, which bear upon the inclined face of the cam-disk $e$.

The collar $j$ is provided with a peripheral groove $o$ for the reception of the fork of a shipping-lever or similar device, so that by moving the said collar $j$ outward on the hub $b$ the rollers $l$, acting upon the levers $m$ and forcing their outer ends toward the driving-shaft, may, through the medium of rollers $n$, acting upon the inclined face of cam-disk $e$, move the driver $a$ inward in the direction indicated by the arrow.

$p$ designates a clutch part consisting of a disk arranged on the shaft $c$ to turn therewith and at the same time to be longitudinally movable thereon, and provided on its face adjacent to the face of the driver $a$ with a washer $q$ of leather or other material having high frictional properties.

$r$ is a machine-driver, which is here shown as consisting of a pulley, but which might be a gear affixed upon the shaft $c$ and connected with the clutch part $p$ by means of pitmen or link-rods $s$, pivoted at their inner ends upon lugs of the clutch part $p$ and at their outer ends to one end of one arm of a bell-crank lever $t$, fulcrumed at $u$ upon the machine-driver $r$. The end of the other arm of the bell-crank lever is made of spherical form and hollow, as at $v$, so as to receive shot or other suitable material to adjust the weight of the arm to suit varying circumstances. A screw-plug $w$ is arranged in an aperture in said spherical part $v$, so that access may be gained to the same and so that it may be closed against the escape of the shot.

$x$ designates a spring interposed between the inner face of the machine-driver $r$ and an adjusting-nut $y$, having a screw-threaded connection with the hub $z$ of the clutch part $p$ and tending to hold the said clutch part in its most inward position on the shaft $c$.

The operation of the invention is as follows: The driver $a$, being run at a high rate of speed, may be moved into engagement with the clutch part $p$, so as to drive the latter and the attached machine-driver $r$ by moving the collar $j$ outward on the hub $b$, causing the rollers $l$ to bear upon the levers $m$, provided with the rollers $n$, which bear against the inclined face of cam-disk $e$ and operate as before explained. The weight of the arms of the crank-lever $t$, provided with the spherical part $v$, will be adjusted by means of the shot therein to be thrown outward when the speed of the machine-driver $r$ shall have reached a predetermined degree of height, so that when there is a tendency to exceed this predetermined speed in the rotation of the driver $r$ the said weighted arms will be thrown outward by centrifugal tendency and the clutch part $p$ will be moved on the shaft $c$ in the direction indicated by the arrow against the stress of the spring $x$ away from the face of the driver $a$ just sufficient to cause slippage between the driver $a$ and clutch part $p$ to an extent that will keep the operation of the machine-driver $r$ down to the predetermined degree. In this way it will be seen that the machine-driver $r$ may (by the operation of the driver $a$ at a high speed) be run at a regular or uniform rate, which is an important matter in the operation of many machines.

The adjusting-nuts $i\ i$ are provided for the purpose of adjusting the cam-disk $e$ longitudinally on shaft $c$, so that the distance which the driver may be moved inward on the said shaft, through the medium of the collar $j$, rollers $l$, and levers $m$ and their rollers $n$, may be regulated, and the nut $y$ is provided for the purpose of adjusting the tension or stress with which the spring $x$ presses the clutch part $p$ toward the driver $a$.

The provision which I have made for adjusting the weighted arms of the centrifugally-operated device is an important feature of the invention, since I am thereby enabled to readily and to the greatest nicety suit a single speed-governor to various machines and circumstances.

It is obvious that changes may be made in the form and arrangement of parts comprising my invention without departing from the nature and spirit thereof.

Having thus explained the nature of my invention and described one way of constructing and using the same, I declare that what I claim is—

1. The combination, with the shaft, of the driver $a$, adapted to turn independently thereon, the clutch part $p$, arranged to turn with the shaft, but longitudinally movable thereon, the machine-driver $r$, fixed upon the shaft, a spring interposed between the driver $r$ and clutch part $p$, a pitman or link-rod $s$, and bell-crank lever $t$, connecting the clutch part $p$ with the driver $r$, the outer or free end of the said bell-crank lever being adjustably weighted, as set forth.

2. The combination, with the shaft, of the driver $a$, adapted to turn independently thereon, the clutch part $p$, arranged to turn with the shaft, but longitudinally movable thereon, the machine-driver $r$, fixed upon the shaft, a spring interposed between the driver $r$ and clutch part $p$, a single friction-disk between the driver $a$ and clutch part $p$, a pitman or link-rod $s$, and bell-crank lever $t$, connecting the clutch part $p$ with the driver $r$, the outer or free end of said bell-crank lever being adjustably weighted, as set forth.

In testimony whereof I have signed my name to this specification, in the presence of two subscribing witnesses, this 4th day of November, A. D. 1890.

HARRIE A. BALLARD.

Witnesses:
ARTHUR W. CROSSLEY,
A. D. HARRISON.